(12) United States Patent
Shibuya et al.

(10) Patent No.: US 7,639,277 B2
(45) Date of Patent: Dec. 29, 2009

(54) METHOD FOR EVALUATING COLOR PICTURE TUBES AND DEVICE FOR THE SAME AND METHOD FOR MAKING COLOR PICTURE TUBES

(75) Inventors: Hisae Shibuya, Yokohama (JP); Tatsuo Horiuchi, Chigasaki (JP); Yoshinao Nozaki, Higashimurayama (JP); Yoshio Yoshiwara, Mobara (JP)

(73) Assignee: Hitachi, Ltd., Tokyo (JP)

( * ) Notice: Subject to any disclaimer, the term of this patent is extended or adjusted under 35 U.S.C. 154(b) by 1404 days.

(21) Appl. No.: 09/824,991

(22) Filed: Apr. 2, 2001

(65) Prior Publication Data

US 2002/0047903 A1 Apr. 25, 2002

(30) Foreign Application Priority Data

Sep. 21, 2000 (JP) ............................. 2000-291948

(51) Int. Cl.
*H04N 17/02* (2006.01)
*H04N 3/22* (2006.01)

(52) U.S. Cl. ..................... 348/190; 348/191; 348/806

(58) Field of Classification Search ................ 348/189, 348/190, 657, 658, 806, 807, 191; 315/368.12, 315/368.13, 370; *H04N 17/00, 3/22*
See application file for complete search history.

(56) References Cited

U.S. PATENT DOCUMENTS

| | | | | |
|---|---|---|---|---|
| 4,593,309 | A * | 6/1986 | Uno et al. | 348/191 |
| 5,896,170 | A * | 4/1999 | Webb et al. | 348/190 |
| 6,014,168 | A * | 1/2000 | Webb et al. | 348/190 |
| 6,020,919 | A * | 2/2000 | Fujii et al. | 348/190 |
| 6,333,627 | B1 * | 12/2001 | Nishikawa | 348/189 |
| 6,462,777 | B1 * | 10/2002 | Hamaguri | 348/188 |

FOREIGN PATENT DOCUMENTS

JP 10-308955 11/1998

* cited by examiner

*Primary Examiner*—Trang U Tran
(74) *Attorney, Agent, or Firm*—Townsend and Townsend and Crew LLP

(57) ABSTRACT

A method for evaluating a color picture tube includes displaying on a display surface of a color picture tube a measurement pattern including a plurality of first patterns arranged at different positions relative to fluophor dots of said color picture tube and a plurality of second patterns near said first patterns and sufficiently large relative to said fluophor dots. A first image is obtained using an imaging element to image said displayed measurement pattern. A second image is obtained using said imaging element to image while controlling light intake to allow brightness components of no more than about 1% of maximum luminance from said first image to be separated from noise and imaged. A third image is created by combining said first image and said second image while adjusting scales according to a light intake ratio. From said third image, display center positions of said plurality of first patterns is calculated using said second pattern positions. Discrete fluophor emission intensity distributions is calculated for each of said plurality of first patterns. An electron beam intensity distribution is obtained by matching display center positions of said plurality of first patterns and combining said plurality of first patterns.

26 Claims, 8 Drawing Sheets

Fluophor pitch   Display pitch

(a) no distortion (b) three (c) four (d) eight

METHOD FOR EVALUATING COLOR PICTURE TUBES AND DEVICE FOR THE SAME AND METHOD FOR MAKING COLOR PICTURE TUBES

CROSS-REFERENCES TO RELATED APPLICATIONS

This application claims priority from Japanese Patent Application No. 00-291948, filed on Sep. 21, 2000, which is incorporated by references for all purposes.

BACKGROUND OF THE INVENTION

The present invention relates to a method for evaluating color picture tubes and device for the same and method for making color picture tubes. The present invention seeks to provide quantitative evaluations of focus characteristics of picture tubes having color selection mechanisms.

Focus characteristics of a picture tube are an important factor that affects display image quality.

In the past, various devices have been proposed to automatically measure focus characteristics by measuring electron beam intensity distributions.

Color picture tubes include color selection mechanisms such as shadow masks and aperture grills. Since the greater part of the electron beam is blocked by these, a method in which an electron beam casts a spotlight on a particular position of the picture tube display and an imaging element is used to capture an image of this spot will not provide an adequate amount of data (luminance information for multiple positions within the beam cross-section) for determining the shape of the electron beam.

To overcome this, Japanese laid-open patent publication number Hei 8-203436 discloses a device for measuring the shape of an electron beam. An electron beam is beamed to multiple fluophors with the beam being aimed with slight horizontal and vertical variations. The multiple fluophors are imaged for each beam position. The relative light emission positions and luminances of the multiple fluophors within the electron beam for each of these beam positions is used to calculate the electron beam shape. However, measurements using this method are time-consuming.

To overcome this problem, Japanese laid-open patent publication number 10308955 discloses a device for measuring the shape of an electron beam. In this device, a measurement pattern, formed from multiple identically shaped basic patterns arranged in a row, is displayed on the display surface of a color picture tube. The size display is controlled so that each basic pattern is positioned differently relative to the fluophors. This is then imaged, and the resulting image data is used to determine relative positions and luminances of fluophors in the basic patterns. From this, the electron beam shape is calculated.

However, this device requires display size to be adjusted so that the basic patterns can be displayed with different fluophor positions. This is time-consuming and also distorts the electron beam. Also, display distortions on the picture tube can prevent different relative positioning of fluophors even with display size changes.

Also, brightness components of 1% or less need to be measured since the eye can easily perceive 1% or less of maximum luminance in an area with lit fluophors.

However, with the device above, sensitivity could only be to 5% brightness due to imaging noise and quantization errors.

BRIEF SUMMARY OF THE INVENTION

The object of the present invention is to overcome the problems of the conventional technology described above and to provide a method and device that can provide fast, highly reliable measurements and evaluations of electron beam intensity distributions Another object the present invention is to provide a method and device that can precisely measure and evaluate electron beam intensity distribution regardless of display distortion on the picture tube. Yet another object of the present invention is to provide a method and device that can easily recognize 1% or less of the maximum luminance of an area of lit fluophors.

In the method for evaluating color picture tubes by measuring electron beam intensity distribution according to the present invention, a measurement pattern displayed on the display surface of the color picture tube is formed from multiple identical basic patterns arranged to have different positions relative to fluophors and at least three auxiliary patterns positioned nearby and having an adequate size relative to the fluophor pitch. The arrangement of this measurement pattern is designed beforehand to take fluophor pitch, linearity changes, and the like into account. This eliminates the need for size adjustments and allows high-speed measurements of electron beam intensity distribution.

Also, with the present invention, a first image is obtained by imaging the measurement pattern with an imaging element. A second image is obtained by imaging while controlling light intake to allow brightness components of 1% or less of the maximum luminance from the first image to be separated from noise and imaged. The scales of the two images are adjusted according to the light intake ratio and the images are combined to provide a third image. This third image allows brightness components of 1% or less the maximum luminance to be separated from noise and detected.

Furthermore, in the present invention, the image obtained in this manner is used to calculate display center positions of the basic patterns based on the luminance median positions of the auxiliary patterns. This allows the positions and luminances of lit fluophors in these basic patterns to be extracted. By aligning the display center positions and interpolating or approximating, an electron beam intensity distribution can be provided.

In one embodiment, a method for evaluating a color picture tube includes displaying on a display surface of a color picture tube a measurement pattern including a plurality of first patterns arranged at different positions relative to fluophor dots of said color picture tube and a plurality of second patterns near said first patterns and sufficiently large relative to said fluophor dots. A first image is obtained using an imaging element to image said displayed measurement pattern. A second image is obtained using said imaging element to image while controlling light intake to allow brightness components of no more than about 1% of maximum luminance from said first image to be separated from noise and imaged. A third image is created by combining said first image and said second image while adjusting scales according to a light intake ratio. From said third image, display center positions of said plurality of first patterns is calculated using said second pattern positions. Discrete fluophor emission intensity distributions is calculated for each of said plurality of first patterns. An electron beam intensity distribution is obtained by matching display center positions of said plurality of first patterns and combining said plurality of first patterns.

These and other objects, features and advantages of the invention will be apparent from the following more particular description of preferred embodiments of the invention, as illustrated in the accompanying drawings.

DESCRIPTION OF THE SPECIFIC EMBODIMENTS

The following is a description of the embodiments of the present invention, with references to the drawings.

Figure 1:
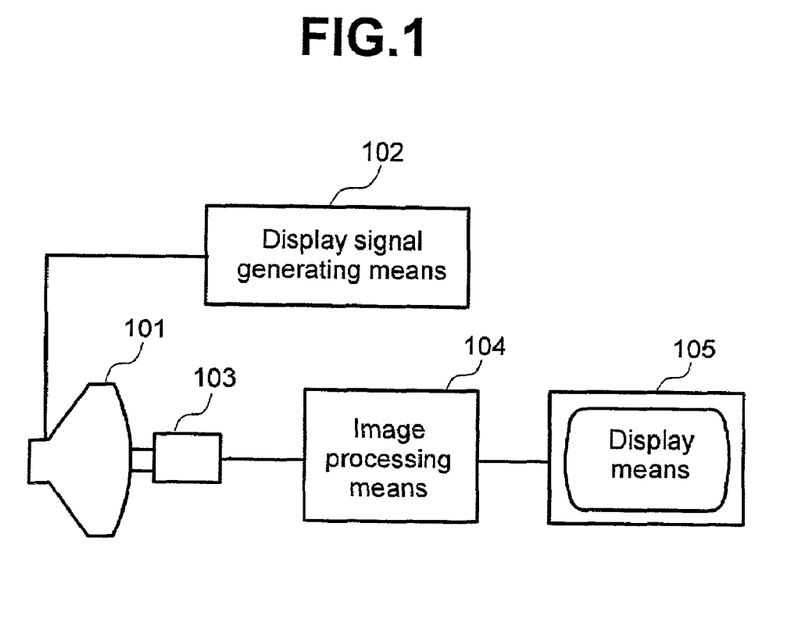
FIG. 1 is a block diagram showing a schematic architecture of an electron beam intensity distribution measurement device according to the present invention.

FIG. 1 shows a sample architecture of a device implementing a method for measuring electron beam intensity distribution according to the present invention.

A color picture tube 101 is the inspected object. In the following description, a shadow-mask picture tube is used as an example, but an aperture grill picture tube can be used as well. Display signal generating means 102 sends a signal to the color picture tube 101 to display a measurement pattern, designed beforehand, at a predetermined signal timing. Imaging means 103 is disposed facing the display surface of the picture tube 101 and captures an image of the displayed measurement pattern. The method used to support imaging means 103 is not shown in the figure. An operator can hold imaging means 103 or a measuring stand can be used. An imaging element that can provide two-dimensional images quickly, e.g., a CCD camera, would be desirable. The image obtained by imaging means 103 is captured in the memory of image processing means 104. Image processing means 104 calculates an electron beam profile from the captured image and displays the results using displaying means 105.

Next, the measurement pattern displayed by display signal generating means 102 will be described.

The measurement pattern is formed from a plurality of basic patterns and at least three auxiliary patterns.

The basic pattern is a pattern used to measure discrete fluorescence intensity distribution in order to obtain the electron beam intensity distribution. To obtain adequate data on fluophor positions and luminance, the relative positions (hereinafter referred to as phases) of the basic patterns in relation to fluophors must be varied. The following is a description of phases, with references to FIG. 2.

Figure 2:
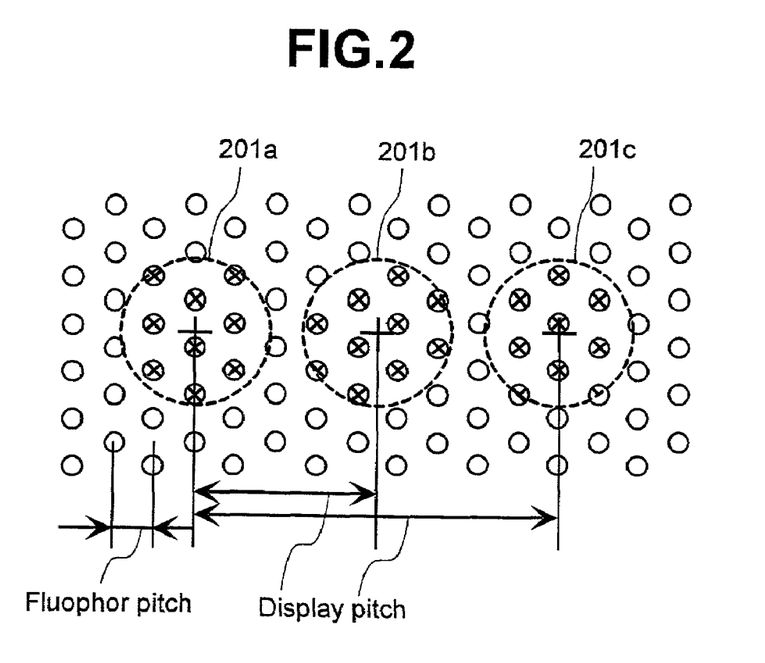
FIG. 2 is a front-view drawing of a display surface of a color picture tube for the purpose of describing phase relationships between basic patterns and fluophors.

Using a basic pattern 201a as a reference, i.e., phase 0, the phases of the other basic patterns are defined as the decimal fraction of the display pitch/fluophor pitch. A basic pattern 201c, which shows no offset, has a phase of 0, and the basic pattern 201b, which is offset by a half-pitch, has a phase of 0.5. A phase is considered out-of-phase if it is within a predetermined range, e.g., 0.1-0.9. This figure shows phases only for the horizontal direction, but phases are defined similarly in the vertical direction as well. If the basic patterns are dots, both horizontal and vertical phases are considered. If the basic patterns are lines, only the phase for the direction perpendicular to the lines are considered. Also, if the picture tube is an aperture-grill display, only the horizontal phase needs to be considered regardless of the shape of the basic patterns.

The measurement pattern includes one basic pattern that serves as a reference and a predetermined number, e.g., at least three, of basic patterns with different phases. The display pitch varies according to display resolution, screen size, and linearity characteristics, and fluophor pitch varies according to quality and display surface position. Thus, phase will vary as well, but even with these variations, the patterns must be arranged so that the above conditions are met. This method allows different models to be covered and allows variable pitch displays to be handled. Also, size adjustments before measuring are made unnecessary.

The auxiliary patterns are provided for display distortions. Since positions need to be detected precisely from the images, the patterns must be sufficiently larger than the fluophor dots.

Figure 3:
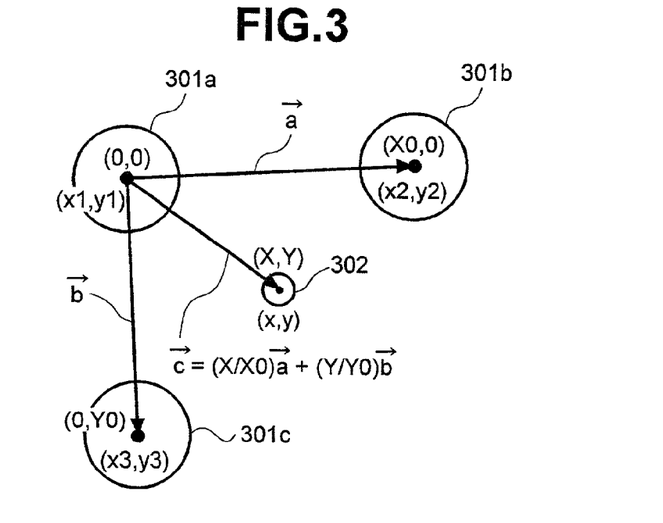
FIG. 3 is a front-view drawing of a display surface of a color picture tube for the purpose describing a method for calculating basic pattern positions using auxiliary pattern positions.

Any shape can be used, but circles allow more precise position measurements than rectangles. At least three patterns are needed. Three auxiliary patterns can detect rotation and stretching. FIG. 3 shows how this works. The position (x, y) on the screen of the basic pattern 302 at display setting position (X, Y) can be calculated using the following equation, where the display setting positions of auxiliary patterns 301a-301c are (0, 0), (X0, 0), and (0, Y0), and the positions measured from the captured image are (x1, y1), (x2, y2), and (x3, y3).

$$x = \frac{X}{X0}(x2 - x1) + \frac{Y}{Y0}(x3 - x1) \qquad \text{(expression1)}$$

-continued $$y = \frac{X}{X0}(y2-y1) + \frac{Y}{Y0}(y3-y1) \quad \text{(expression2)}$$

Figure 4:
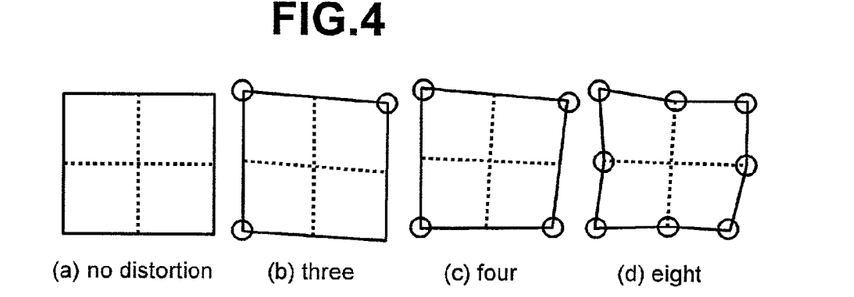
FIG. 4 is a front-view drawing of a display surface of a color picture tube showing the relation between the number of auxiliary patterns and the types of distortions that can be handled.

If there is significant distortion, more auxiliary patterns can be used. FIG. 4 shows the relationship between the number of auxiliary patterns and the distortions that can be handled.

Figure 5:
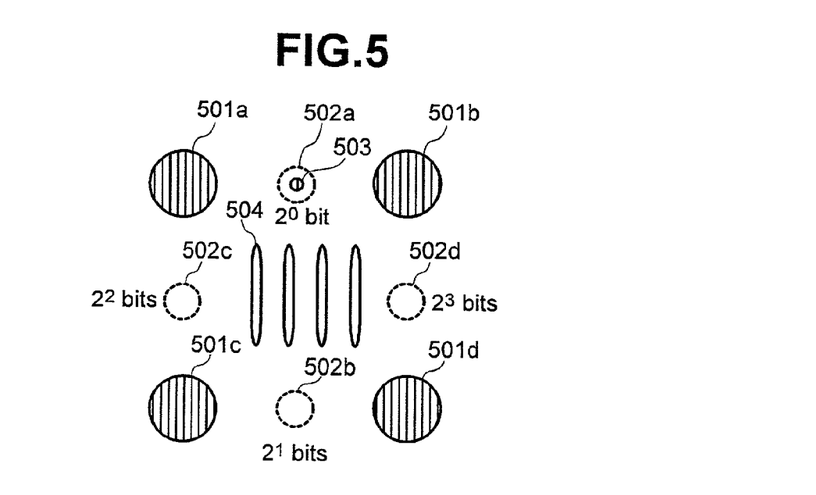
FIG. 5 shows an example of a measurement pattern that includes position recognition patterns.

When measuring multiple positions on the picture tube surface, different position recognition patterns are added to the measurement pattern at the measurement positions. FIG. 5 shows an example of a measurement pattern with position recognition patterns. Position recognition patterns are created as follows.

Figure 6:
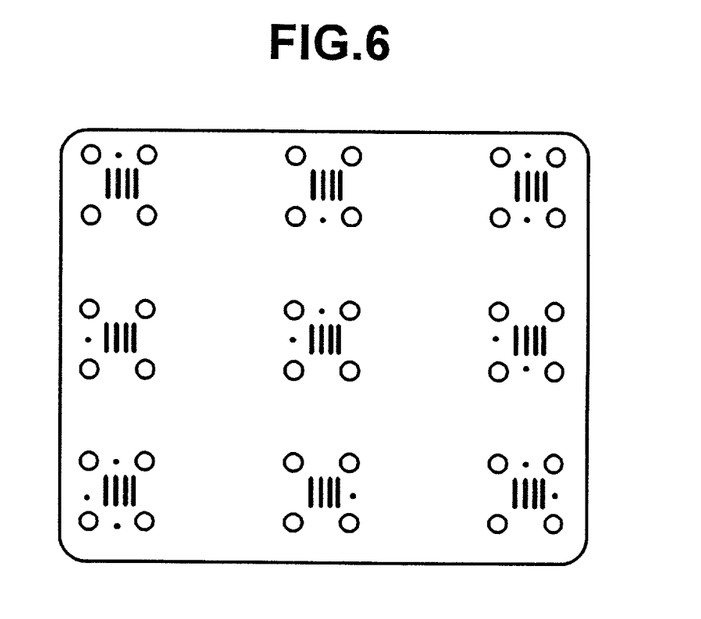
FIG. 6 is a front-view drawing of a display surface of a color picture tube displaying measurement patterns at multiple positions.

Measurement positions are assigned numbers beginning with 1, and these numbers are converted into binary bit codes. Each bit is associated with a predetermined position in the measurement pattern, and the 0/1 value indicates the presence of a pattern. The positions associated with the bits can be determined in any manner, but evaluation can be made easier by, for example, starting with the lower-order bits for patterns 502a-502d, which are interposed between the auxiliary patterns 501a-501d shown in FIG. 5. The displayed pattern can be the smallest display unit (a dot). In the example in FIG. 5, a position recognition pattern 503 is placed at the position associated with 2 to the 0 power, so the position identification number is 1. The pattern 504 is a basic pattern. FIG. 6 shows an example of a display pattern where measurements are taken for nine positions on the picture tube display surface.

Figure 7:
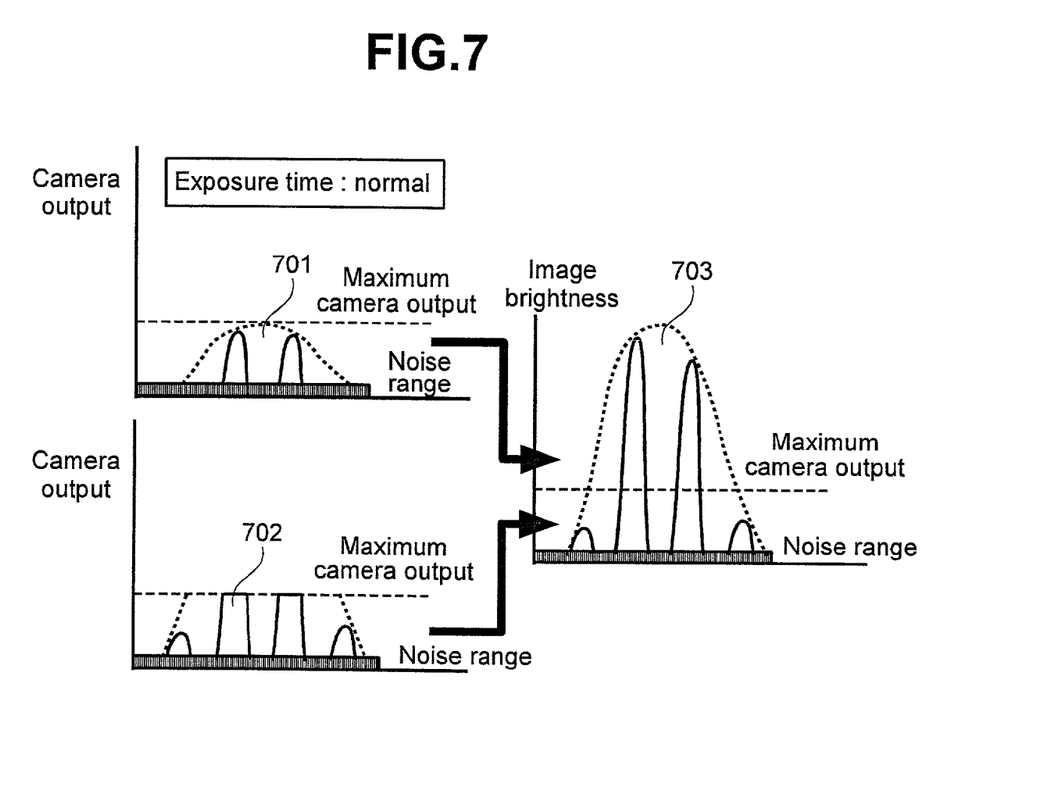
FIG. 7 is a graph for the purpose of describing an imaging method that combines camera output with different exposure times to provide a wider dynamic range.

Next, an imaging method using imaging means 103 will be described, with 10 references to FIG. 7.

With images captured by CCD cameras and stored in memory, the components with lower signal values, i.e., darker components, are generally lost in noise and quantization errors and do not provide reliable data. The components at 5% the standard output range and below are usually considered unreliable.

The minimum brightness to be measured can be prevented from being lost in noise by combining at least two images with different light intakes by the imaging element.

First, a standard exposure image 701 is obtained by adjusting the light intake to prevent saturation at the maximum luminance value. Then, a long-exposure image 702 of the same location is obtained by extending exposure time to prevent the minimum brightness, i.e., 1% of maximum luminance, from being lost in noise. The bright sections of the long-exposure image 702 are saturated. The ratio of exposure times is used to match up the scales of the normal exposure image 701 and the long-exposure image 702, and the saturated regions of the long-exposure image 702 are replaced with the data for the same regions from the normal exposure image 701, thus providing a substitute image 703. With this operation, values from 1% to 100% of the maximum luminance can be detected without being lost in noise. It would also be possible to use three or more images with different exposure times, adjusting the scales and combining the images as described above.

By combining multiple images with different exposures (exposure times) in this manner, the resulting image will appear to be from an imaging element with a much wider dynamic range than normal.

In the example above, exposure time is controlled by using an electronic shutter on a CCD camera. However, the present invention is not restricted to this method, and other methods can be used as long as two or more images with different light intakes can be obtained. For example, methods such as switching ND filters or adjusting the aperture can be used.

Figure 8:
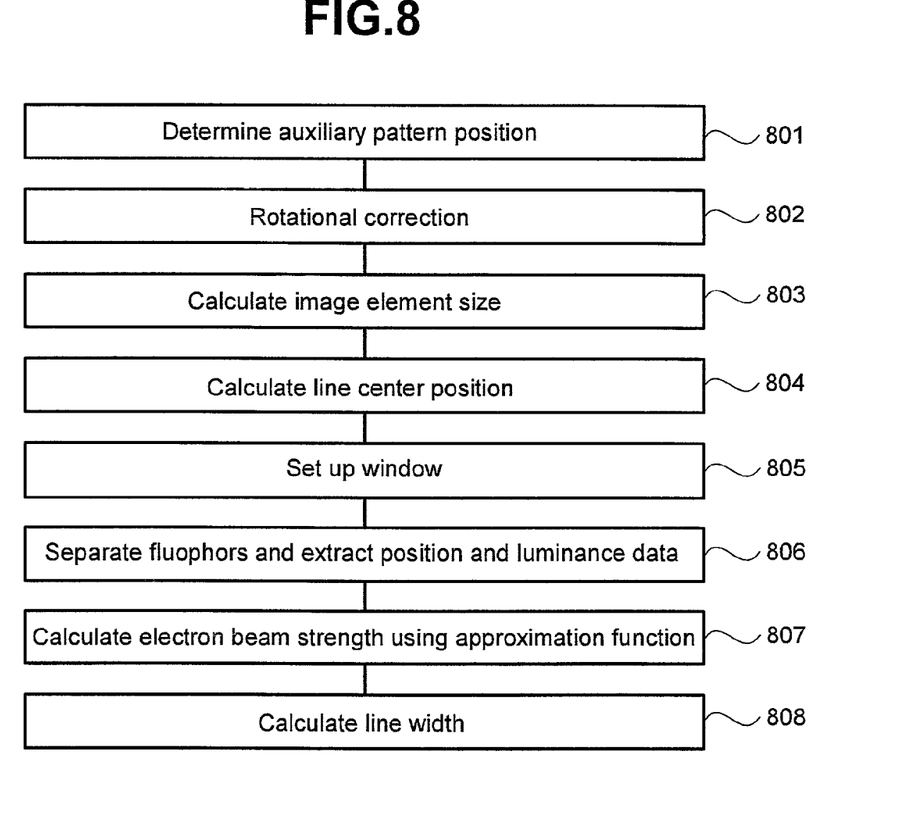
FIG. 8 is a flowchart showing a flow of image processing operations performed by image processing means.

Next, image processing operations performed by image processing means 104 will be described, using basic patterns of vertical lines as an example. FIG. 8 shows the flow of image processing operations.

First, auxiliary pattern position detection is performed (801). A method in which luminance weights are determined allows simple and precise position detection.

Next, rotational correction is performed based on the auxiliary pattern positions (802), and image element size is determined (803). The image element size can be calculated by measuring the fluophor pitch, in image elements, of an auxiliary pattern and dividing it by a fluophor pitch measured from a fluophor pitch set up beforehand (the specification value). A fixed value can be used instead of measuring the image element size. However, since the display surface of a picture tube is within a glass panel which does not have a uniform thickness, maintaining a fixed distance between the imaging element and the display surface is difficult. Thus, in practice, image elements do not have a fixed size.

A tele-centric optical system will provide a fixed image element size, but the optical system involved is more complex, leading to increased cost and weight. A very shallow focal depth can be used to keep a fixed distance between the imaging element and the display surface during the measuring operation, but focusing adjustments must be made each time, making the operation more complex. When image element size is measured each time, the distance between the imaging element and the display surface can be anywhere within the focal range. By using a deep focal depth for the imaging optical system, the need to make focal adjustments each time is eliminated.

Also, more precise measurements are provided compared to using a fixed value for image element size.

After measuring image element size, the center position of each line is determined (804), and a window is set up around the center of each line to determine illumination distribution (805). The window size is such that vertically the window fits within the line and horizontally the line width fits within the window.

Next, the fluophors lit up within the window are separated, and the luminance median position and the maximum luminance are extracted (806). One possible method for separating fluophors is to perform bi-level conversion using a fixed threshold value. In order to extract fluophors with low luminance, it would be desirable to first detect the peaks and then determine a threshold value that allows the peaks to be separated from adjacent fluophors. The luminance median position is converted to a value which uses the line center position as a reference. For vertical lines, only horizontal position data is used, so data in the same row can be averaged to form a single merged piece of data. Also, dubious data can be found and discarded at this point from fluophor interval and luminance data.

Figure 9:
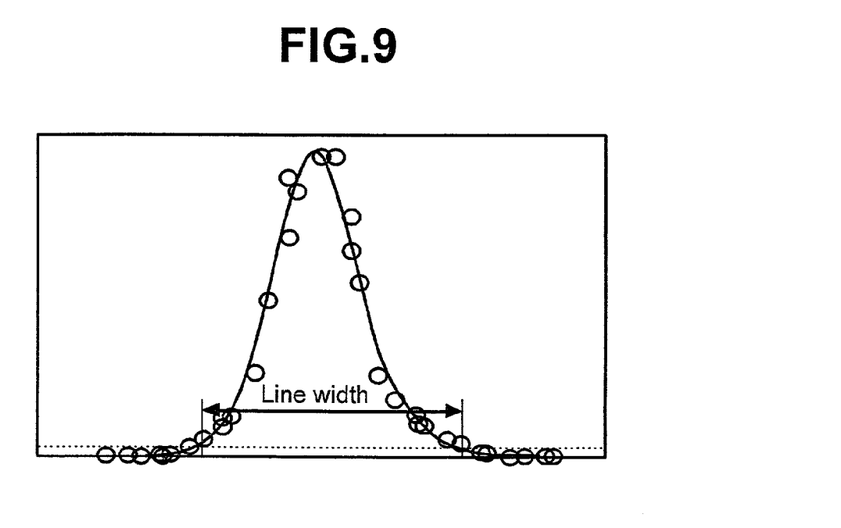
FIG. 9 is a graph illustrating the relationship between fluophor position and luminance data and an approximation function thereof.

Next, the fluorescence data extracted from all windows is approximated with a function where the horizontal positions are independent variables and luminance is a dependent variable (807). FIG. 9 shows the fluorescence data and the approximation function. Since the fluorescence intensity is proportional to electron beam intensity, the curve indicated by this function is the electron beam intensity distribution in the horizontal direction. There are no special restrictions on the function used here, but it would be desirable to use the following equation, which is a high-order exponential function that can provide good approximation of the shape of the electron beam intensity distribution.

$$y = \exp\left(\sum_{k=0}^{N} a_k \chi^k\right) \quad \text{(expression 3)}$$

To handle asymmetric shapes and sharp peaks, an equation of the fourth order or higher is needed.

For step 807, the electron beam intensity distribution can also be obtained using interpolation rather than an approximation function. To do this, the fluorescence data is rearranged along horizontal positions and interpolation is performed using lines or spline curves.

Finally, as shown in FIG. 9, a line width based on a luminance that is a certain proportion of the peak value is calculated using the image element size from step 803 (808). It is known that a value of approximately 1% the peak value will provide a line width measurement consistent with visual observations.

The display device 105 displays at least the line width and the electron beam intensity distribution shape. A pattern image may be displayed as well. Also, reliability of the results can be evaluated by displaying the fluophor data and the electron beam intensity distribution curve superimposed on each other, with the fluophor data color-coded (not shown in the figure) to indicate which line it was extracted from. Thus, if the fluophor data and the electron beam intensity distribution curve match, there is a high degree of reliability.

The electron beam intensity distribution and line width can be calculated in the same manner if horizontal lines are used for the basic pattern. For horizontal lines, only the horizontal position data is used, and the vertical electron beam intensity distribution is calculated. By using both vertical lines and horizontal lines in the measurement pattern and performing step 804 through step 808 separately for the vertical and horizontal lines, a single imaging can be used to obtain electron beam intensity distribution in both the vertical and horizontal directions.

If dots are used for the basic patterns, a window is set up to surround the dot at step 805. At step 806, fluophor data is extracted using similar methods as described above. At step 807, approximation is performed with a function where both horizontal and vertical positions are independent variables and luminance is a dependent variable. The surface represented by this function is the two-dimensional electron beam intensity distribution.

The above description covered a measuring operation for one position, but a standard picture tube focus evaluation is performed over the entire display surface. To do this, measurement patterns are displayed at multiple positions on the display surface. Distinct position recognition patterns are included in the measurement patterns as described above. Positions are identified by checking for patterns at positions associated with predetermined bits. As a result, measurement results can be saved in association with measurement positions regardless of the sequence used for performing measurements. Also, for variable pitch displays, the fluophor pitch associated with different positions can be entered beforehand to allow image element sizes to be calculated accurately based on the fluophor pitch. This provides high-precision electron beam intensity distribution and line width measurements.

Displaying means 105 can display detected measurement positions so that the operator can perform measurements while confirming measurement positions. It would also be possible for displaying means 105 to be divided up according to measurement positions, with results displayed at the section of displaying means 105 corresponding to the measurement position. The display screen would first be cleared and each time an electron beam intensity distribution measurement is performed only the results display for the corresponding section would be updated. With this type of display, electron beam intensity distributions for multiple positions on the picture tube can be displayed simultaneously, allowing comparisons and overall evaluations.

Also, the electron beam intensity distribution can be compared with predetermined reference values, with areas within the reference value range being displayed on displaying means 105 with a different color from areas outside the reference value range. This provides a display that allows quick recognition of results from evaluations using reference values.

As described above, imaging means can be supported by hand or can be secured using a measurement stand. These will be described in more detail.

Figure 10:
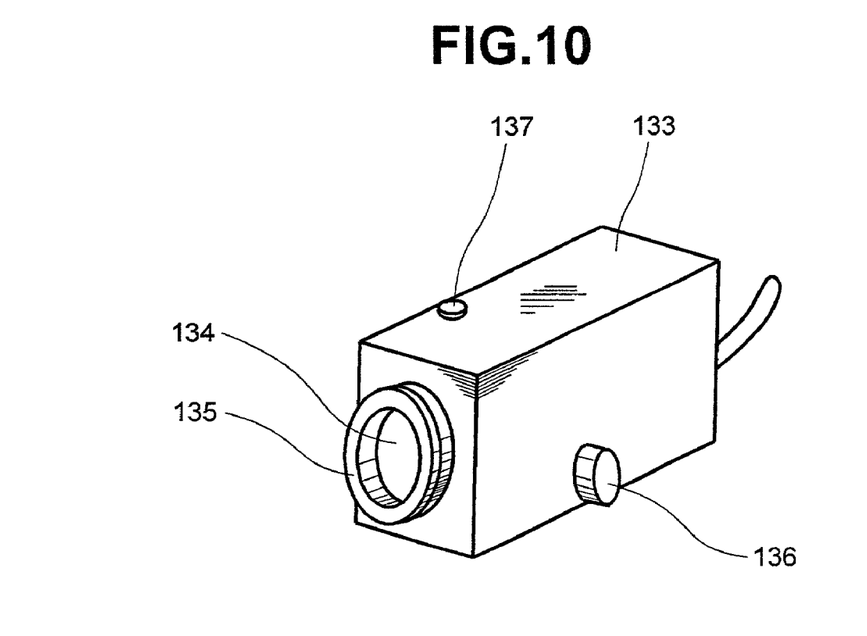
FIG. 10 is a perspective drawing showing the exterior of hand-held imaging means according to the present invention.
Figure 11:
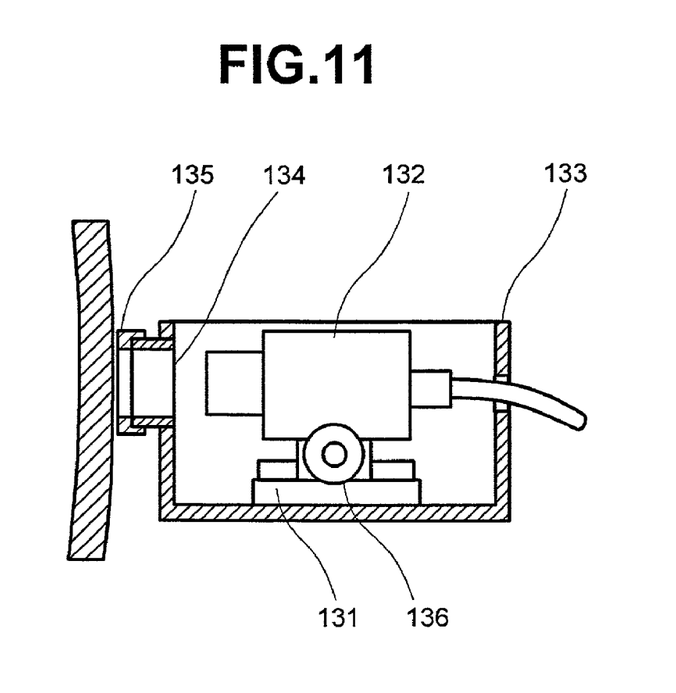
FIG. 11 is a cross-section drawing of hand-held imaging means presented in FIG. 10.

FIG. 10 shows an example of imaging means 103 supported by hand (hereinafter referred to as hand-held). FIG. 11 shows a cross-section drawing thereof.

A CCD camera 132 is secured to a stage 131, and the stage 131 is secured to a case 133 covering the entire device. The direction of movement of the stage is aligned with the optical axis. A light inlet window 134 is formed on the case 133 along a plane perpendicular to the optical axis. A pad 135 formed from a slip-resistant material such as rubber is attached to the edge of the window. The display device 105 directly displays the image captured by the CCD camera 132.

The operator pushes and holds the pad 135 against the panel surface of the picture tube 101, focusing and capturing images while watching the image displayed on the display device 105. Focusing is performed by moving the stage 131 using a position adjustment knob 136. Alternatively, an auto-focus mechanism can be provided.

Image capture is performed by selecting a position that will cover a measurement pattern and pressing a measurement start switch 137. With this arrangement, images of the display surface can be captured in a stable manner without being affected by outside light. Also, positions can be selected and measured freely. Furthermore, the picture tube can be oriented in any direction as long as there is enough space to have imaging means 103 facing the display surface.

With the hand-held structure, there may be some shaking. A method for detecting this will be described. In the present invention, the image 703 is obtained by combining the normal exposure image 701 and the long exposure image 702. These two images are assumed to be for the same position, and the presence of shaking will prevent the images from being combined properly. To handle this possibility, the normal exposure image 701 is captured first, followed by the long exposure image 702, and then another normal exposure image 701 is captured. The median positions of an auxiliary pattern from the two normal exposure images are compared to see if there is any offset between them. If there is an offset, this is indicated on the display device 105, and the image capture operation is repeated.

Image tilting can also be a problem, and this is detected using sets of horizontally arranged auxiliary patterns.

Figure 12:
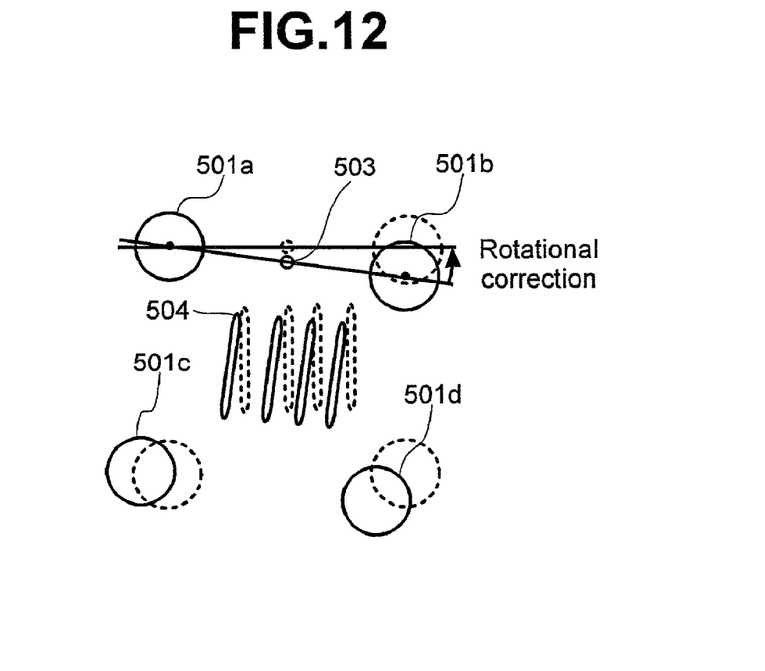
FIG. 12 is a front-view drawing of a display surface of a color picture tube for the purpose of describing a method for detecting tilt.

As shown in FIG. 12, the slope of a line connecting the luminance median positions of two horizontally arranged auxiliary patterns is calculated. Using this slope, an affine transformation is performed to apply rotation, thus correcting the image and eliminating the tilting. Image tilt can be detected using sets of vertically arranged auxiliary patterns as well. Also, slopes can be calculated for two or more sets of horizontally or vertically arranged auxiliary patterns, and the average of these slopes can be used.

Figure 13:
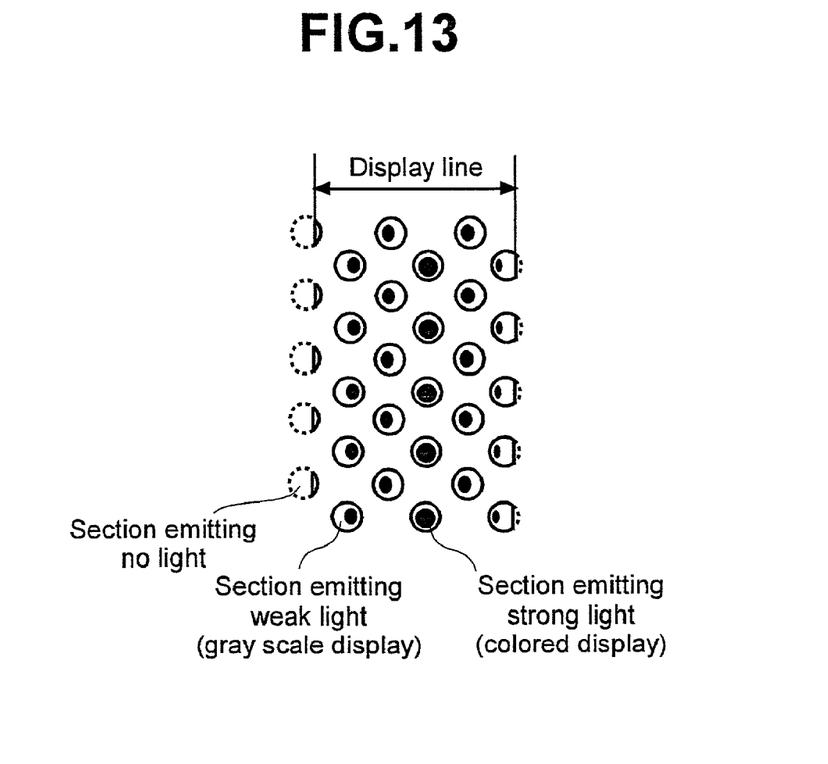
FIG. 13 is a front-view drawing of a display surface showing a section of an image displayed directly on a display device.

Focusing is performed while viewing the image displayed on the display device 105 so that the contrast of the lit fluophors is optimized. However, determining the position for optimal contrast is difficult. Thus, when displaying the image captured by the CCD camera 132 on the display device 105, image elements up to a particular threshold value are displayed in grayscale, and image elements at or above the threshold value in brightness are displayed in a color that can be easily distinguished from grayscale, e.g., red. This allows contrast quality to be evaluated in terms of the amount of high-luminance areas, i.e., areas displayed in color, thus providing easy focusing.

The description above is for manual focusing, but it is also possible for imaging means 103 to be equipped with an auto-focusing mechanism.

Figure 14:
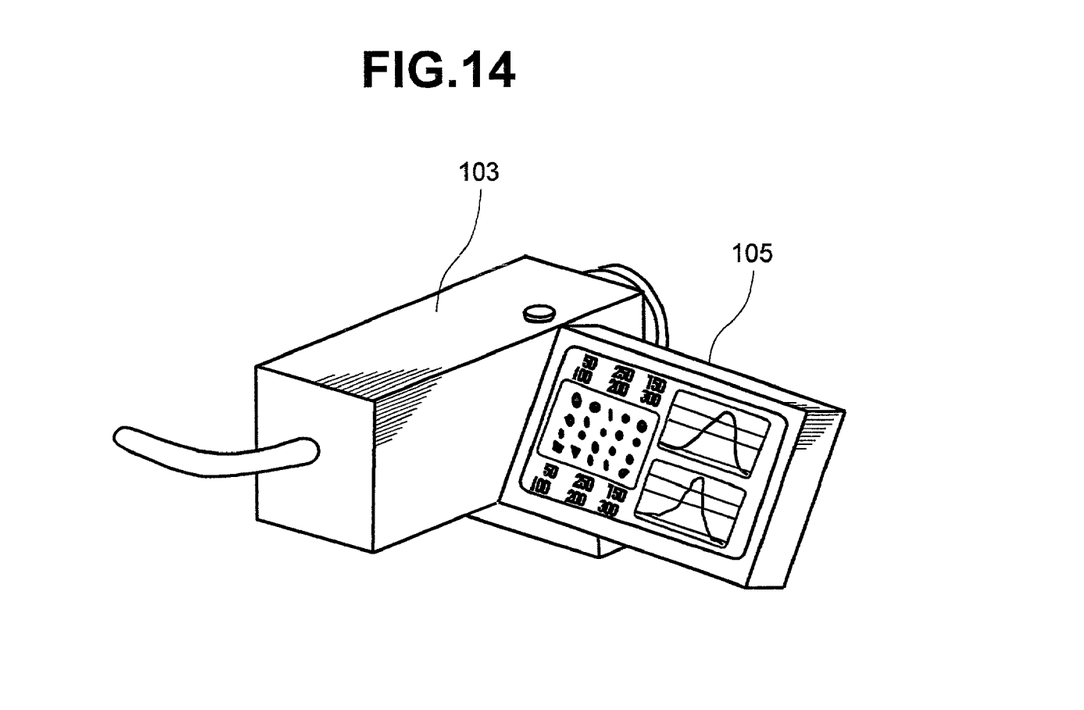
FIG. 14 is a perspective drawing showing an example in which imaging means and a display device are formed integrally.

As shown in FIG. 14, the display device 105 can be integrated with imaging means 103. A small liquid crystal display would be suited for the display device 105.

This keeps the distance the eye has to travel during measurements at a minimum and allows imaging to be performed in a stable manner.

Figure 15:
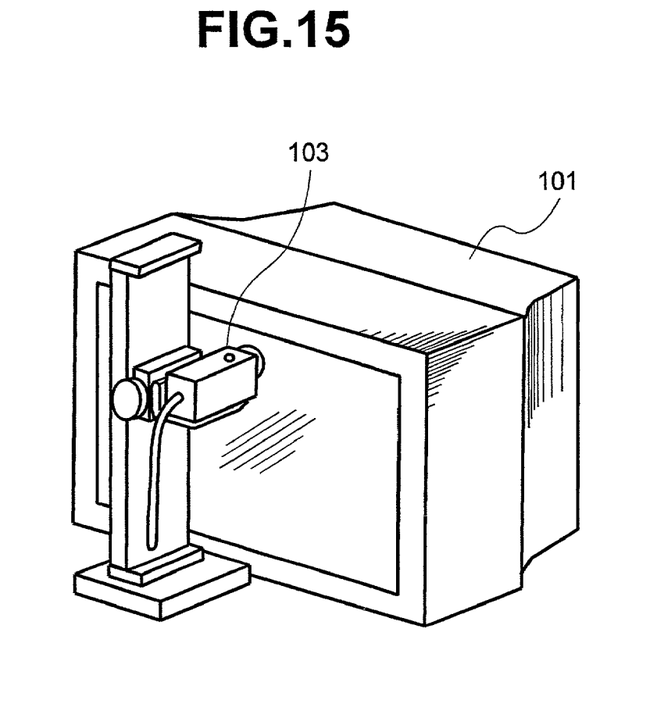
FIG. 15 is a perspective drawing of a measurement stand, imaging means, and a color picture tube showing an example of how the measurement stand is used to support imaging means while measuring a display surface of the color picture tube.

FIG. 15 shows an example in which a measurement stand is used to support imaging means 103. In this example, imaging means 103 is attached to a stage that slides vertically. Vertical positioning is performed with a handle. Horizontal positioning and positioning in the direction perpendicular to the display surface are performed by moving the entire measurement stand. It would also be possible to have imaging means 103 attached to a stage that can rotate and move in the direction perpendicular to the display surface, with the entire stage being able to slide vertically. It would also be possible to have the measurement stand shown in FIG. 15 formed so that the entire stand can slide horizontally. Any structure that can maintain a position for a long period of time is acceptable, including simple structures such as tripods.

Systems that use measurement stands avoid problems such as shaking and tilting. Also, increases in weight, such as from auto-focus mechanisms, are not a problem. However, maintaining an orientation perpendicular to the display surface when imaging is difficult with non-flat picture tubes, so in such cases a hand-held system is desirable for providing proper orientation.

Also, FIG. 13 [?FIG. 15?] shows a single imaging means 103, but it would also be possible to have a measurement stand that supports multiple imaging means 103 at the same time, one for each measurement position. In this case, measurement patterns are displayed all at once. Imaging and electron beam intensity distribution calculations are performed one at a time and all results are displayed at once on the display device 105.

Of course, the method for measuring electron beam intensity distribution can be applied not only to picture tubes during the production process but also in inspection and adjustment operations performed on completed display monitors.

Next, an example of a method for making picture tubes containing a focus characteristic inspection process using the measurement method presented above will be described.

Figure 16:
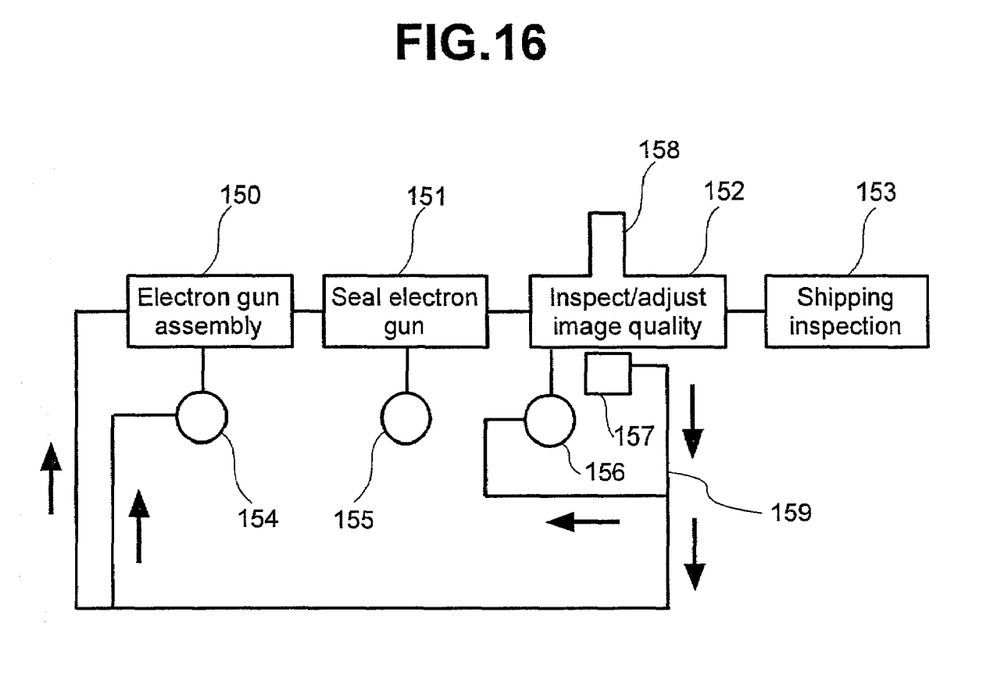
FIG. 16 is a plan drawing showing a schematic architecture of a picture tube production line.

The main processes in picture tube production include: an electron gun assembly 150; an electron gun sealing process 151; an image quality inspection/adjustment 152; and a shipping inspection process 153.

In the electron gun assembly process 150, multiple electrodes 154 are assembled. In the electron gun sealing process 151, the electron gun assembled in the electron gun assembly process 150 is mounted in a bulb 155, a vacuum is formed, and the bulb is sealed. In the image quality inspection/adjustment process 152, a deflection yoke 156 is mounted on the bulb 155 and image quality is inspected and adjusted. In this process, a focus measurement device 157 described above is used to measure intensity distribution at the process central or the peripheral area of the screen and the distribution is quantified. When the distribution is at or above a reference value, the picture tube is sent out by a conveyor 158.

Irregularity information 159 from the light distribution measurement results detected by the focus measurement device 157 is sent to the electron gun assembly process 150, the electron gun sealing process 151, and the image quality inspector/adjustment process 152. Based on the irregularity information 159, the electron gun assembly process 150 corrects the relative positioning between the electrodes. The electron gun sealing process 151 corrects the shape of the electrodes 154 and mounts it in the bulb 155, forms a vacuum, and seals the bulb. The image quality inspection/adjustment process 152 corrects the winding distribution of the coil in the deflection yoke 156 based on the irregularity information 159 and mounts it on the bulb 155. These corrections can be performed automatically or with the assistance of an operator.

In FIG. 16, the device 157 does not need to be a focus measurement device and can instead be a device that automatically adjusts focus or a device that assists in focus adjustment. Also, the device 157 can be used in the shipping inspection process 153. In this case, only picture tubes with intensity distribution within certain standards are shipped, thus ensuring product quality of shipped products.

With this production method, quantitative measurements can be made for distribution of light intensities of less than 1% maximum luminance, roughly equivalent to visual sensitivity. Furthermore, feedback can be provided for parts from previous processes and the assembly process. This allows stable production of high-quality picture tubes.

With the electron beam intensity distribution measurement method described above, a measurement pattern, formed from multiple basic patterns and at least three auxiliary patterns, is displayed. An image of this is captured all at once, allowing measurements to be made quickly. In the measurement pattern, the multiple basic patterns are arranged so that they have different positions relative to the fluophors, thus eliminating the need for adjusting display size during measurement. This eliminates the need to spend time on adjusting display size and the need for a display size adjustment mechanism. Also, measurements can be made under the same conditions as the actual display signal timing used for the finished product. Also, direct visual confirmation of the measurement pattern is possible, thus allowing consistency with visual observation to be checked easily and providing highly reliable measurements.

In the imaging method, a first image is obtained through normal imaging, and a second image is obtained by controlling the light intake to allow areas with brightness of 1% or less of the maximum luminance from the first image to be separated from noise. The scales of the two images are adjusted according to the light intake ratio, and the two images are combined to provide a third image. This allows brightness of 1% or less of the maximum luminance to be separated from noise and detected. Thus, the electron beam intensity distribution can be determined with high precision down to 1% or less of the maximum luminance. This allows focus evaluation to be performed to a degree that is consistent with human visual perception.

Also, the center position of a basic pattern is calculated based on auxiliary pattern positions. This allows the electron beam intensity distribution to be measured precisely regardless of surface distortion.

Also, the luminance intensity distribution is superimposed with the centers of the reference patterns, and approximation is performed using a fourth-order or higher exponential function. Analysis of this curve can provide feedback for electron gun design.

Also, image element sizes are calculated each time from the fluophor pitch in the auxiliary patterns. This provides high-precision measurements of line widths.

Quantified management of focus characteristics is made possible by continuously recording specific or multiple line widths based on maximum luminance ratios. Alternatively, pass/fail evaluation is possible by comparing line widths with a reference value.

The invention may be embodied in other specific forms without departing from the spirit or essential characteristics thereof. The present embodiment is therefor to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method for evaluating a color picture tube comprising:
    displaying on a display surface of a color picture tube a measurement pattern including a plurality of first patterns arranged at different positions relative to fluophor dots of said color picture tube and a plurality of second patterns near said first patterns and sufficiently large relative to said fluophor dots;
    obtaining a first image using an imaging element to image said displayed measurement pattern;
    obtaining a second image using said imaging element to image while controlling light intake to allow brightness components of no more than about 1% of maximum luminance from said first image to be separated from noise and imaged;
    creating a third image by combining said first image and said second image while adjusting scales according to a light intake ratio;
    calculating, from said third image, display center positions of said plurality of first patterns using said second pattern positions;
    measuring discrete fluophor emission intensity distributions for each of said plurality of first patterns; and
    obtaining an electron beam intensity distribution by matching display center positions of said plurality of first patterns and combining said plurality of first patterns.

2. The method for evaluating a color picture tube as described in claim 1, wherein in said step for displaying said measurement pattern, there are at least a predetermined number of said first patterns or said line patterns or said dot patterns having phases, defined by a decimal fraction of a display pitch/fluophor pitch, within a predetermined range relative to a first pattern or a line pattern or a dot pattern serving as a reference.

3. The method for evaluating a color picture tube as described in claim 1, wherein in said step for displaying said measurement pattern, at least two of said second patterns are arranged horizontally or vertically, and in said step for obtaining said third image, a slope of a line connecting said at least two second patterns is calculated and rotational transformation is applied to said image so that said slope is 0.

4. The method for evaluating a color picture tube as described in claim 1, wherein in said step for obtaining said third image, a pitch of said fluophors contained in said second patterns is measured in image element units, and said fluophor pitch is used to calculate an image element size.

5. The method for evaluating a color picture tube as described in claim 1, wherein in said step for obtaining said third image, at least one position of said second patterns is detected from said first image and a corresponding second pattern position is detected from said second image, and an offset between said detected positions is used to detect an offset between said first image and said second image.

6. The method for evaluating a color picture tube as described in claim 1, wherein in said step for displaying said measurement pattern, said measurement pattern is displayed at a plurality of positions on said picture tube display surface, and a position recognition pattern is displayed close to each of said measurement patterns.

7. The method of claim 1, wherein said first patterns are basic patterns and said second patterns are auxiliary patterns.

8. The method of claim 7, wherein there are at least three auxiliary patterns.

9. A method for evaluating a color picture tube, comprising:
    displaying on a display surface of a color picture tube a measurement pattern formed from a plurality of basic patterns and auxiliary patterns;
    obtaining a first image by imaging said displayed measurement pattern under a first light intake condition;
    obtaining a second image by imaging said displayed measurement pattern under a second light intake condition;
    obtaining a third image by combining said first image and said second image based on said first light intake condition and said second light intake condition;
    determining a display center position of said basic pattern from said auxiliary pattern position information from said third image;
    measuring discrete fluophor emission intensity distributions for each of said plurality of basic patterns; and
    obtaining an electron beam intensity distribution by matching display center positions of said plurality of basic patterns for which discrete fluophor emission intensity distributions were calculated and combining said plurality of basic patterns; and
    outputting information relating to said determined electron beam intensity distribution.

10. The method for evaluating a color picture tube as described in claim 9, wherein said second light intake condition is set so that, in said second image imaged under said second light intake conditions, images associated with areas having a brightness of no more than about 1% of a maximum luminance from said first image are distinguishable from noise.

11. The method for evaluating a color picture tube as described in claim 9, wherein, in said step for displaying a measurement pattern, said measurement pattern is displayed at a plurality of positions on said picture tube display surface, and a position recognition pattern is displayed close to each of said measurement patterns.

12. A method for evaluating a color picture tube, comprising:
    displaying a measurement pattern on a display surface of a color picture tube;
    obtaining a first image by imaging said displayed measurement pattern with an imaging element under a first light intake condition of said imaging element;

obtaining a second image by imaging said displayed measurement pattern with said imaging element under a second light intake condition of said imaging element;

obtaining a third image having a wider dynamic range than images obtained through imaging with said imaging element by combining said first image and said second image;

measuring a discrete fluophor emission intensity distribution for said measurement pattern; and obtaining an electron beam intensity distribution using said measured discrete fluophor emission intensity distribution and said calculated data for said plurality of basic patterns; and outputting information relating to said determined electron beam intensity distribution, wherein in said step for displaying said measurement pattern, said measurement pattern is displayed at a plurality of positions on said picture tube display surface, and a position recognition pattern is displayed close to each of said measurement patterns.

13. The method for evaluating a color picture tube as described in claim 12, wherein said second light intake condition is set so that, in said second image imaged under said second light intake conditions, images associated with areas having a brightness of no more than about 1% of a maximum luminance from said first image are distinguishable from noise.

14. The method for evaluating a color picture tube as described in claim 12, wherein said third image with said wide dynamic range provides noise separation in a range of about 1% to about 100% of a maximum luminance of said image.

15. A device for evaluating a color picture tube, comprising:

a display generator to display on a display surface of a color picture tube a measurement pattern including a plurality of basic patterns arranged at different positions relative to fluophor dots of said color picture tube and at least three auxiliary patterns near said basic patterns and sufficiently large relative to said fluophor dots;

an imager to obtain a first image using an imaging element to image said displayed measurement pattern and obtain a second image using said imaging element to image while controlling light intake to allow brightness components of no more than about 1% of maximum luminance from said first image to be separated from noise and imaged;

an image processor to create a third image by combining said first image and said second image while adjusting scales according to a light intake ratio;

a first calculating unit to calculate from said third image display created by said image processor a display center positions for each of said plurality of basic patterns using said auxiliary pattern positions;

a measuring unit to measure discrete fluophor emission intensity distributions for each of said plurality of basic patterns; and a second calculating unit to obtain an electron beam intensity distribution by matching display center positions calculated by said first calculating unit and combining said plurality of basic patterns.

16. The device for evaluating color picture tubes as described in claim 15, wherein in said display generator, there are at least a predetermined number of said basic patterns or said line patterns or said dot patterns having phases, defined by a decimal fraction of a display pitch/fluophor pitch, within a predetermined range relative to a basic pattern or a line pattern or a dot pattern serving as a reference.

17. The device for evaluating color picture tubes as described in claim 15, wherein in said image processor, at least two of said auxiliary patterns are arranged horizontally or vertically and, in a step for obtaining said third image, a slope of a line connecting said at least two auxiliary patterns is calculated and rotational transformation is applied to said image so that said slope is 0.

18. The device for evaluating color picture tubes as described in claim 15, wherein said image processor measures a pitch of said fluophors contained in said auxiliary patterns in image element units, and said fluophor pitch is used to calculate an image element size.

19. The device for evaluating color picture tubes as described in claim 15, wherein said image processor detects at least one position of said auxiliary patterns from said first image and detects a corresponding auxiliary pattern position from said second image, and an offset between said detected positions is used to detect an offset between said first image and said second image.

20. The device for evaluating color picture tubes as described in claim 15, wherein said image processor displays said measurement pattern at a plurality of positions on said picture tube display surface, and displays a position recognition pattern close to each of said measurement patterns.

21. A device for evaluating a color picture tube, comprising:

a displaying unit to display a measurement pattern, including a basic pattern and an auxiliary pattern, on a display surface of a color picture tube;

an imaging unit to obtain a first image by imaging said displayed measurement pattern under a first light intake condition using an imaging element and obtaining a second image by imaging said displayed measurement pattern under a second light intake condition using said imaging element;

a processing unit to create a third image by combining said first image and said second image obtained from said imaging unit based on said first light intake condition and said second light intake condition;

a first calculating unit to determine a display center position of said basic pattern from said auxiliary pattern position information from said third image created by said processing unit;

a measuring unit to measure discrete fluophor emission intensity distributions for each of said plurality of basic patterns; and a second calculating unit to determine an electron beam intensity distribution by using display center position data calculated by said first calculating unit and combining said discrete fluophor emission intensity distributions measured for each of said basic patterns by said measuring unit; and an outputting unit to output information relating to said determined electron beam intensity distribution.

22. The device for evaluating a color picture tube as described in claim 21, wherein said second light intake condition of said imaging unit is set so that, in said second image imaged under said second light intake conditions, images associated with areas having a brightness of no more than about 1% of a maximum luminance from said first image are distinguishable from noise.

23. The device for evaluating a color picture tube as described in claim 21, wherein said displaying unit displays said measurement pattern at a plurality of positions on said picture tube display surface, and a position recognition pattern is displayed close to each of said measurement patterns.

24. A device for evaluating a color picture tube, comprising:
- pattern displaying means for displaying a measurement pattern on a display surface of a color picture tube;
- imaging means for obtaining a first image and a second image by imaging said displayed measurement pattern under a first light intake condition and a second light intake condition, the first image being obtained with an imaging element under said first light intake condition of said imaging element, the second image being obtained with said imaging element under said second light intake condition of said imaging element;
- image generating means for generating a third image having a wider dynamic range than images obtained through imaging with said imaging means by combining said first image and said second image obtained with said imaging means;
- discrete fluophor emission intensity distribution measuring means for measuring discrete fluophor emission intensity distribution for said plurality of basic patterns; and
- determining means for determining an intensity distribution of an electron beam beamed to said display surface of said color picture tube using discrete fluophor emission intensity distribution information measured by said discrete fluophor emission intensity distribution measuring means and information of said third image generated by said image generating means; and
- outputting means for outputting information relating to said determined electron beam intensity distribution,
- wherein said pattern displaying means displays said measurement pattern at a plurality of positions on said picture tube display surface, and a position recognition pattern is displayed close to each of said measurement patterns.

25. The device for evaluating a color picture tube as described in claim 24, wherein said second light intake condition of said imaging means is set so that, in said second image imaged under said second light intake conditions, images associated with areas having a brightness of no more than about 1% of a maximum luminance from said first image are distinguishable from noise.

26. The device for evaluating a color picture tube as described in claim 24, wherein said third image generated by said image generating means provides noise separation in a range of about 1% to about 100% of a maximum luminance of said image.

* * * * *